United States Patent
Narisawa et al.

[11] Patent Number: 5,191,504
[45] Date of Patent: Mar. 2, 1993

[54] CONTROL APPARATUS FOR ELECTROMAGNETIC DEVICE HAVING PROPORTIONAL SOLENOID

[75] Inventors: Junichi Narisawa, Tokyo; Morio Oshina, Ibaragi, both of Japan

[73] Assignee: Hitachi Construction Machinery Co., Ltd., Tokyo, Japan

[21] Appl. No.: 582,213

[22] PCT Filed: Jan. 29, 1990

[86] PCT No.: PCT/JP90/00100
§ 371 Date: Sep. 28, 1990
§ 102(e) Date: Sep. 28, 1990

[87] PCT Pub. No.: WO90/08914
PCT Pub. Date: Aug. 9, 1990

[30] Foreign Application Priority Data
Jan. 30, 1989 [JP] Japan ................................. 1-21841
Dec. 7, 1989 [JP] Japan ................................. 1-319670

[51] Int. Cl.⁵ ........................................... H01H 47/32
[52] U.S. Cl. ................................................... 361/186
[58] Field of Search ............... 361/139, 160, 170, 186, 361/187; 323/283, 286, 287; 363/21

[56] References Cited
U.S. PATENT DOCUMENTS
4,195,333  3/1980  Hedel ..................................... 363/21
4,562,548 12/1985  Anderson et al. ..................... 361/18
4,701,588 10/1987  Fukasawa ............................ 323/283
4,849,869  7/1989  Tanuma et al. ....................... 363/56

FOREIGN PATENT DOCUMENTS
62-259444 12/1987 Japan.

OTHER PUBLICATIONS
Yasuo Tanaka, Abstract for JP 60-117604, "Controller for Electromagnetic Device With Proportional Solenoid", Jun. 25, 1985.
Rosenberg, "Dictionary of Computers, Information Processing, and Telecommunications", 1984, pp. 547 and 586.

Primary Examiner—Sharon D. Logan
Assistant Examiner—Richard T. Elms
Attorney, Agent, or Firm—Cushman, Darby & Cushman

[57] ABSTRACT

A control apparatus for an electromagnetic device having a proportional solenoid has a duty factor calculation circuit for calculating a duty factor on the basis of a control target value, a pulse signal formation circuit for forming a pulse signal based on the calculated duty factor, an exciting current formation circuit for forming an exciting current for electrically stimulating the coil of an electromagnetic apparatus in response to the formed pulse signal, and an integration circuit for integrating the exciting current of the coil in synchronization with the pulse signal. This control apparatus calculates the duty factor using the duty factor calculation circuit from a control target value and the integration value output from the integration circuit.

12 Claims, 10 Drawing Sheets

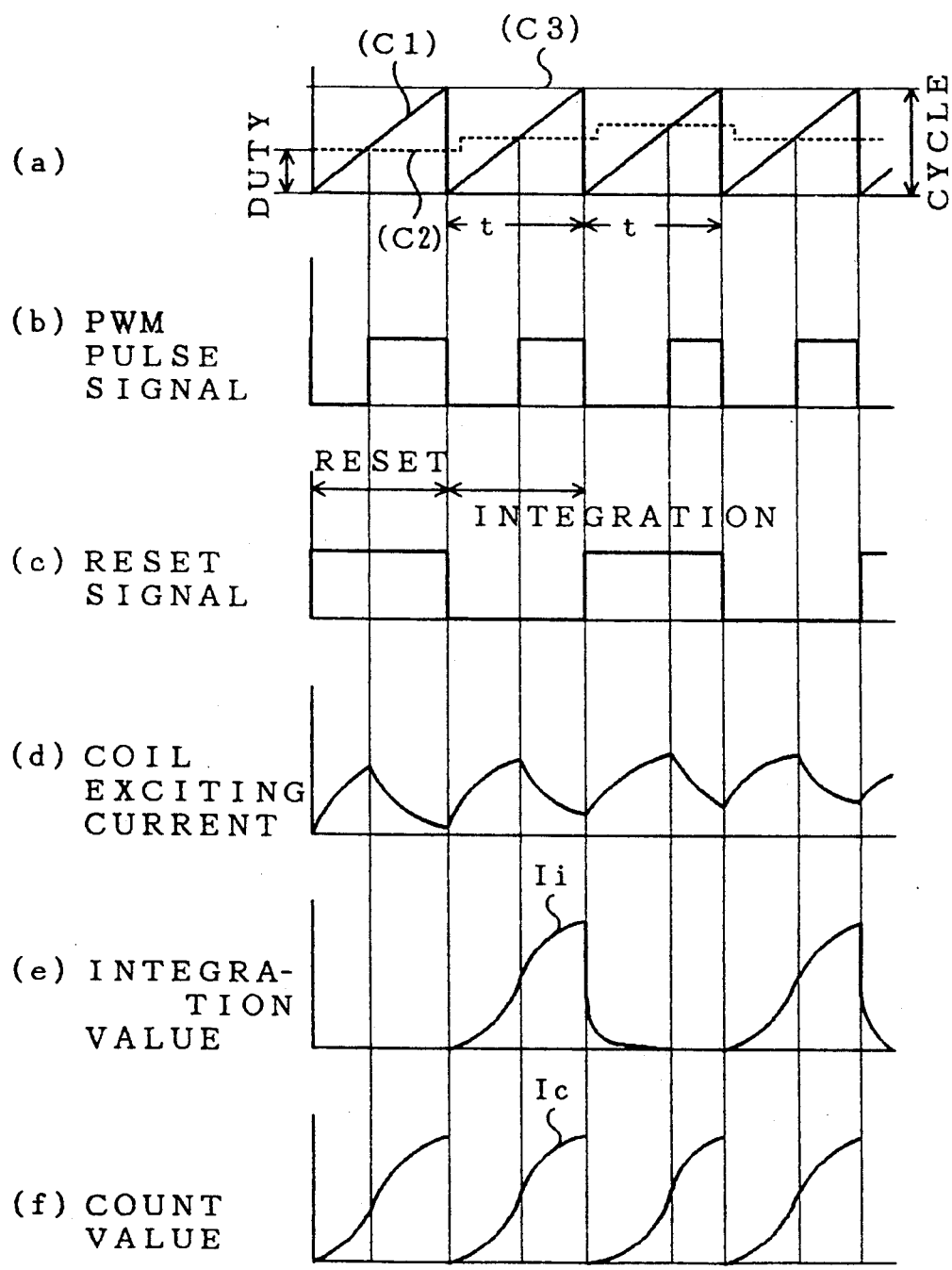

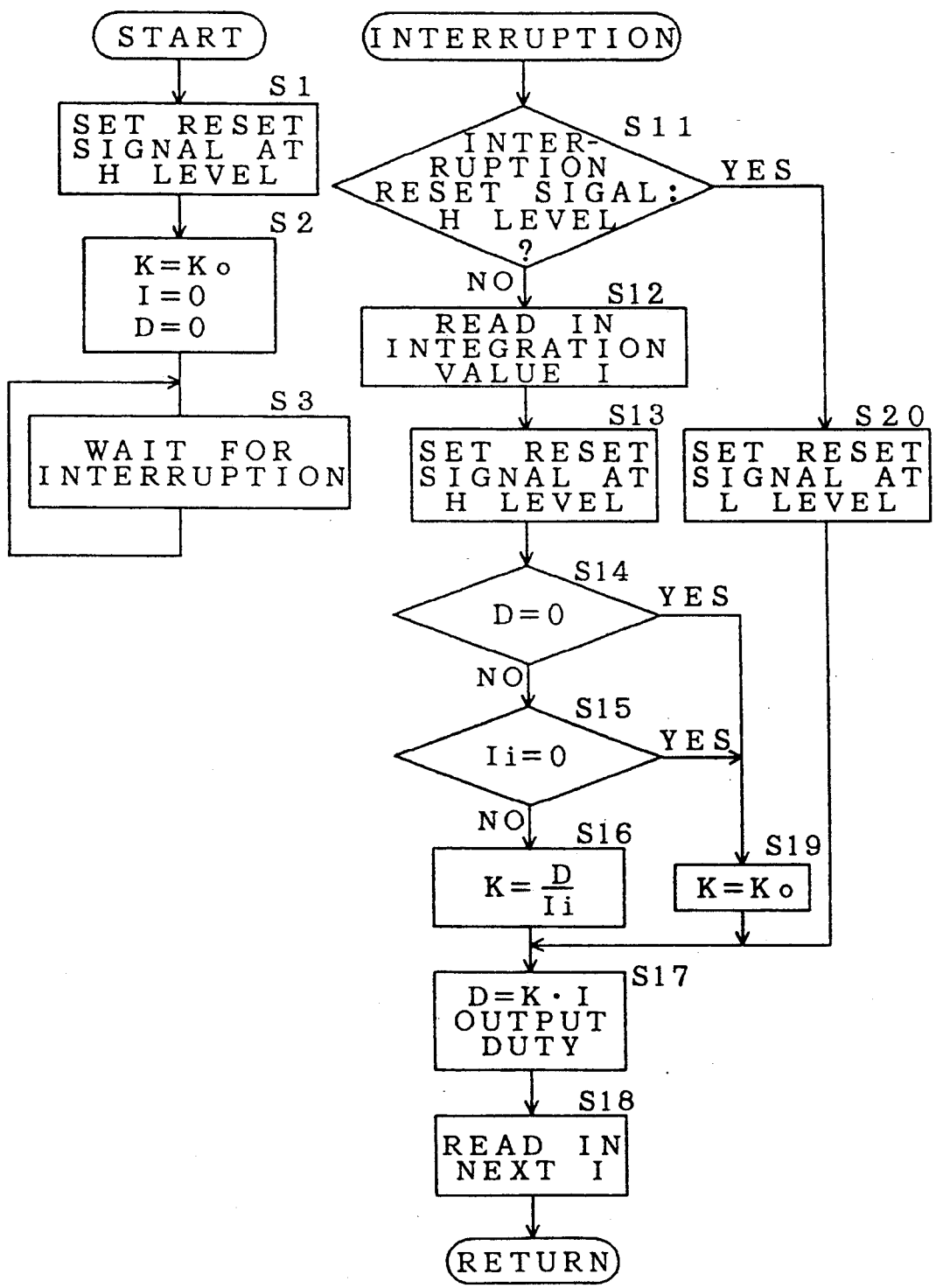

CONTROL APPARATUS FOR ELECTROMAGNETIC DEVICE HAVING PROPORTIONAL SOLENOID

DESCRIPTION

1. Technical Field

The present invention relates to a control apparatus for controlling an electromagnetic device, e.g., an electromagnetic proportional valve, having proportional solenoid which generates a force proportional to the value of a supplied current

2. Background Art

For example, in hydraulic circuits of construction machines, etc., electromagnetic proportional valves are widely used to control hydraulic pressure and oil flow rate. The control amount (hydraulic pressure and oil flow rate) of an electromagnetic proportional valve varies substantially in proportion to the exciting current I of a coil, as shown in the characteristic curve of FIG. 8.

In the prior art, in order to control such an electromagnetic proportional valve, a control apparatus having such circuit configuration as shown in FIG. 9 is used. That is, a controller 1, which is comprised of a microprocessor (MCU), outputs a digital signal responsive to a control target value. This digital signal is converted to an analog voltage signal by a DA converter 2. This analog voltage signal is converted to an analog current signal by a voltage/current converter (VI converter) 3. The analog current signal is applied to the coil of an electromagnetic proportional valve 4 and excited.

The voltage/current converter 3 is provided with a dither function in which a high-frequency current of 200 to 600 Hz is superposed to the coil current in the range of 10 to 20% of the rated current of the electromagnetic proportional valve 4, thus resulting in decrease of a hysteresis of the electromagnetic proportional valve 4.

In this configuration, however, there has been a problem in that the apparatus is expensive because it uses a DA converter 2 and a voltage/current converter 3. As an apparatus for controlling the electromagnetic proportional valve 4 without the above-mentioned expensive circuit parts such as the voltage/current converter or the like, a control apparatus having the configuration shown in FIG. 10 is known.

Shown in the figure are a controller 1 which is comprised of a microprocessor, an input and output control section 5 comprised of a digital output section 5a and an AD converter 5b, a driving transistor 6 for forming an exciting current for supplying electricity to the coil of the electromagnetic proportional valve 4, and a flywheel diode 7.

The controller 1 provides a duty factor value corresponding to the target value of the exciting current allowed to flow through the coil of the electromagnetic proportional valve 4 to the digital output section 5a. The digital output section 5a outputs a pulse which is at a high level for a period corresponding to the duty factor to the driving transistor 6. The high level of the pulse causes the coil of the electromagnetic proportional valve 4 to be excited for a period corresponding to the duty factor. At this time, the exciting current flowing through the coil is in the form of a sawtooth as a result of the inductance component of the coil itself and the action of the flywheel diode 7, and it is fed back to the power supply voltage side. Its average current value is proportional to the power supply voltage and the duty factor of the coil current. Hence, the power supply voltage of the coil is read out to the controller 1 via the AD converter 5b, and the duty factor value to be supplied to the digital output section 5a is corrected according to the value of the power supply voltage thus read. As a result, the exciting current is set to its target value.

Therefore, a voltage/current converter is not required in the configuration of FIG. 10, so it is inexpensive in comparison to the configuration of FIG. 9. Also, an actual exciting voltage is detected and fed back, and its duty factor is corrected so that the exciting current come close to a control target. The accuracy is therefore improved over that of the apparatus of FIG. 9.

However, in the above-mentioned configuration, a duty factor is determined from an input control target value, presupposing the direct current resistance component of a coil in a certain standard state. Accordingly, the following problem arises. As the temperature of a coil rises due to a long period of exciting of the coil and an increase in oil temperature, the direct current resistance of the coil increases. As a result, an exciting current is insufficient, even at the same control target value, and a required control amount is not obtained.

As an apparatus which solves such a problem, the control apparatus of the electromagnetic device disclosed in Japanese Patent Publication No. 62-59444 is known. This control apparatus operates as follows.

In a dead zone of an operation lever in which the operation of the lever does not cause the electromagnetic proportional valve to be driven, a fixed instruction signal which does not cause an actuator to be operated is output. The exciting current of the coil at this time is detected by a combination of resistors connected in series to the coil, a differential amplifier for amplifying the potential difference across the resistor, and a smoothing filter for averaging the output from the differential amplifier. That is, the output from the smoothing filter is sampled at a predetermined timing to detect the exciting current. Then, a duty factor conversion coefficient (correction value) is determined on the basis of the exciting current thus detected, and a new duty factor is determined from the duty factor conversion coefficient determined and a control target value which is output in an active zone of the operation lever in which the operation of the operation lever causes the electromagnetic proportional valve to be driven.

In the control apparatus disclosed in the publication described above, a new duty factor is calculated through detecting of the exciting current which flows under the operation of the operation lever in the dead zone, and determining of the duty factor conversion coefficient on the basis of the detected exciting current. Therefore, an effective correction of the duty factor cannot be made in the active zone of the operation lever. The greater the exciting current, the quicker the variations in the temperature of the coil increases. In particular, when the operation lever is operated at full stroke, an effective correction is not made. The pulsation of the exciting current is smoothed by the smoothing filter. However, since the cycle of a PWM pulse signal in a pulse width modulation driving is usually 50 to 80 Hz or thereabouts and the time constant of a coil is very large, the pulsation of the exciting current cannot be smoothed sufficiently. A problem therefore exists in that a great error appears in a duty factor correction amount due to the timing of the sampling.

DISCLOSURE OF THE INVENTION

The present invention is applied in a control apparatus for electromagnetic device having proportional solenoid with a duty factor calculation means for calculating a duty on the basis of a control target value instructed, a pulse signal formation means for forming a pulse signal with the calculated duty factor, and an exciting current formation means for forming an exciting current for electrically stimulating the coil of an electromagnetic device in response to the pulse signal formed.

The drawbacks of a conventional apparatus can be removed by the following configuration. An integration means for integrating the exciting current of the coil in synchronization with the pulse signal is provided and the duty factor is calculated by the duty calculation means from the control target value instructed and the integration value output from the integration means.

It may also be arranged that a correction coefficient calculation means for calculating a correction coefficient from the ratio between the integration value of the integration means and the duty factor which has been used as to form this integrated exciting current is provided and the duty factor is calculated by the duty factor calculation means from the control target value instructed and the correction coefficient calculated.

The duty factor calculation means may be adapted to calculate the duty factor from the deviation between the integration value and the control target value.

The integration means may be comprised of an analog or a digital integration circuit. In the case of a digital type, the integration means is comprised of a current-frequency conversion means for generating a pulse train with a frequency corresponding to the exciting current of the coil and a counting means, which is reset in synchronization with a pulse signal, for counting this pulse train. The duty factor calculation means calculates the duty factor from the control target value instructed and the counting value from the counting means.

When an exciting current flows through the coil of an electromagnetic device, the control amount of the electromagnetic device, for example, the stroke amount of an electromagnetic proportional valve is controlled in response to the exciting current. The exciting current flowing through the coil is integrated by the integration means in synchronization with a pulse signal input to the exciting current formation means. The duty factor calculation means calculates a new duty factor from a control target value instructed and this integration value. Therefore, an exciting current corresponding to its duty factor is supplied to the coil.

In a case where a correction coefficient is used, when the correction coefficient is determined from the ratio between the integration value and the duty factor which has been used as to form this integrated exciting current, the duty factor calculation means calculates a new duty factor from this correction coefficient and the control target value instructed.

In a deviation system, a duty factor is determined from the deviation between the integration value and the control target value.

In the case of a digital integration circuit, an exciting current is converted to a frequency pulse train proportional to its magnitude and the pulse train is counted in synchronization with the above-mentioned pulse signal. The duty factor is determined from this count value and the control target value.

In the above-mentioned invention, a duty factor is determined on the basis of a control target value instructed from the operation lever and the above-mentioned integration value and the exciting current is integrated in synchronization with a PWM pulse. Therefore, the duty factor is corrected with high accuracy by the exciting current in the active zone of the operation lever in which the operation of the operation lever actually operates an electromagnetic device, such as an electromagnetic proportional valve or the like, and the variation in the exciting current resulting from a rise in the temperature of the coil of the electromagnetic device can be compensated with high accuracy.

As a result, for example, in a hydraulic articulated arm trace control system which controls an amount of an electromagnetic proportional valve through a feedforward control, the deviation of an actual trace from a calculated trace is extremely small and an advantage is obtained in that a speed deviation is extremely small in a speed control system. Furthermore, in a system in which a feedback control is used together with &:he feedforward control, stable control is made possible since the deviation of a feedback amount from a target value becomes smaller.

BRIEF DESCRIPTION OF THE DRAWINGS

FIG. 3 is a time chart for explaining the operation of the embodiment;

FIGS. 4A, 4B, 6, 7A and 7B are flowcharts respectively illustrating the outline of the duty factor correction process in respective embodiments;

BEST MODE FOR CARRYING OUT THE INVENTION

Figure 1A:
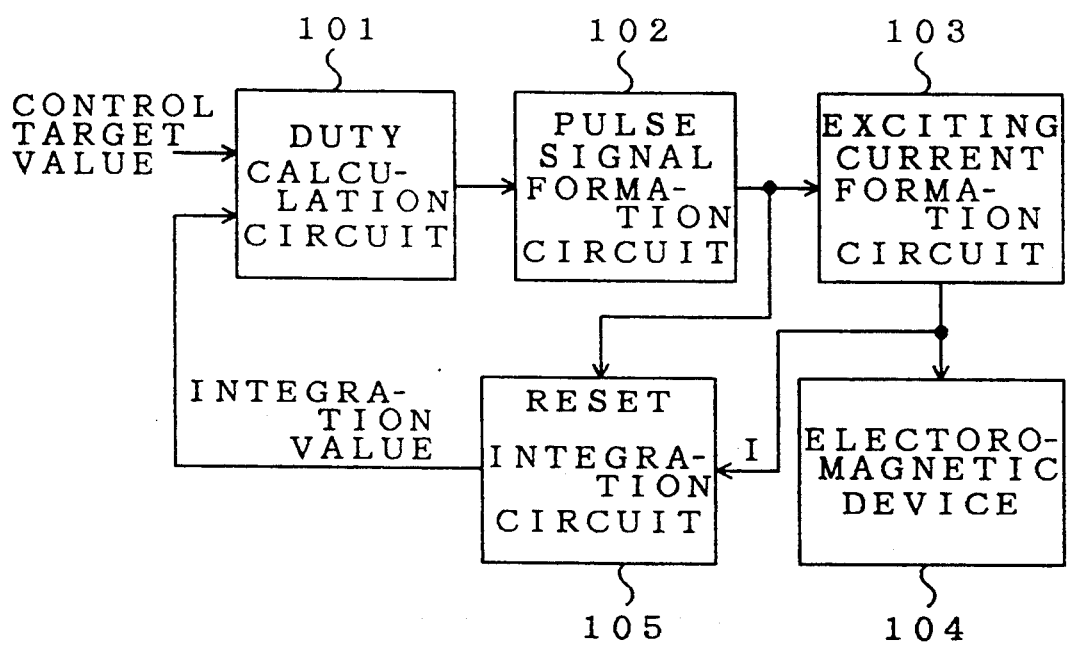
FIGS. 1A to 1C are views respectively illustrating a schematic configuration of the present invention.

FIG. 1A is a block diagram explaining the outline of the present invention.

A control apparatus for electromagnetic device having proportional solenoid shown in this figure comprises a duty factor calculation circuit 101 for calculating a duty factor on the basis of a control target value instruction, a pulse signal formation circuit 102 for forming a pulse signal in a calculated duty factor, an exciting current formation circuit 103 for forming an exciting current for electrically stimulating the coil of an electromagnetic device 104 in response to a formed pulse signal, and an integration circuit 105 for integrating the exciting current of the coil in synchronization with the pulse signal. This control apparatus calculates a duty factor by the duty factor calculation circuit 101 from a control target value instructed and an integration value output from the integration circuit 105.

The operation of this apparatus is as follows. When an exciting current flows through the coil of the electromagnetic device 104, the control amount of the electromagnetic device 104 is controlled according to the exciting current. The exciting current flowing through the coil is integrated by the integration circuit 105 in synchronization with a pulse signal applied to the exciting current formation circuit 103. The duty factor calculation circuit 101 calculates a new duty factor from a control target value instructed and this integration value. Therefore, an exciting current proportional to the duty factor is supplied to the coil.

Figure 1B:
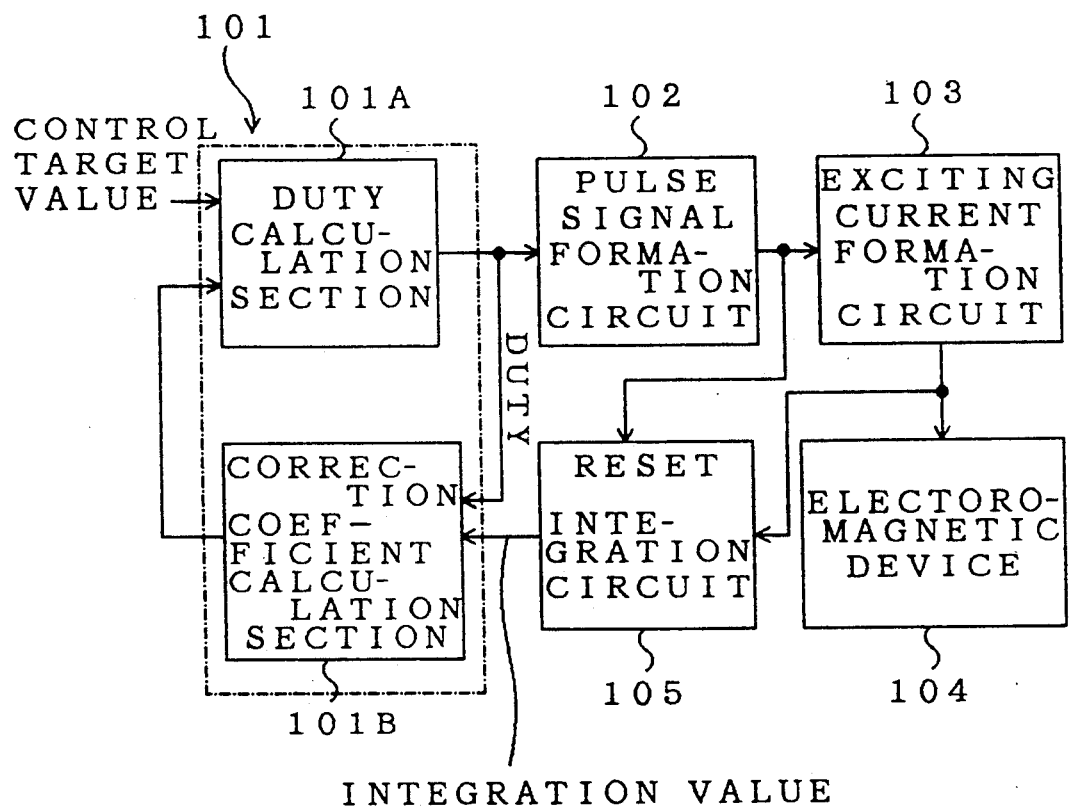

The control apparatus shown in FIG. 1B is a modification of the control apparatus shown in FIG. 1A. The duty factor calculation circuit 101 of the apparatus is comprised of a duty factor calculation section 101A and a correction coefficient calculation section 101B. A correction coefficient is calculated by the correction coefficient calculation section 101B from a duty determined by the duty factor calculation section 101A and an integration value determined by the integration circuit 105, and the duty factor is calculated from this correction coefficient and a control target value.

Figure 2:
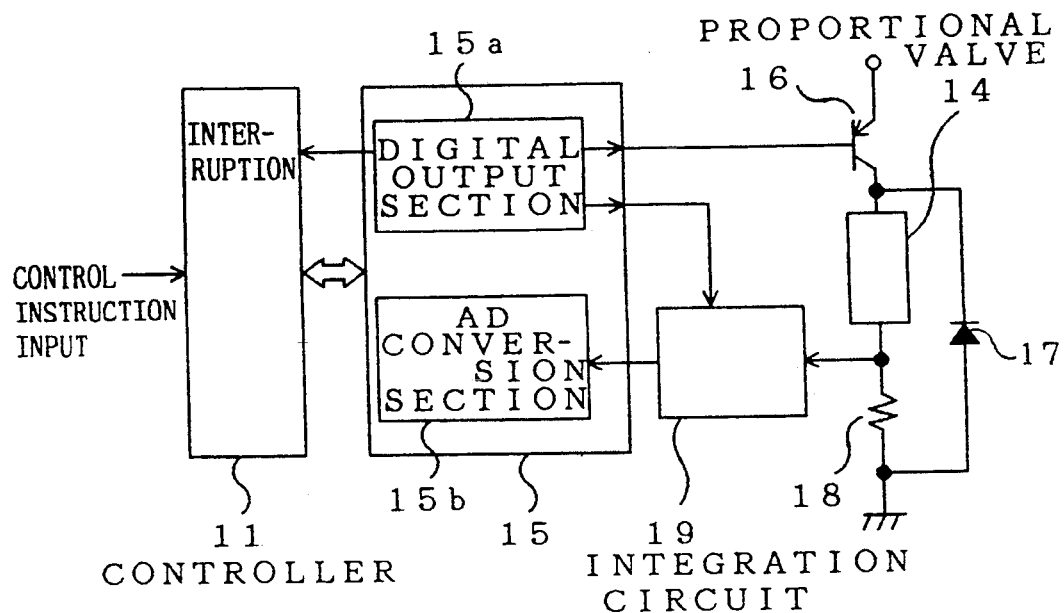
FIGS. 2 and 5 are configurational views illustrating the two embodiments of the present invention.
Figure 8:
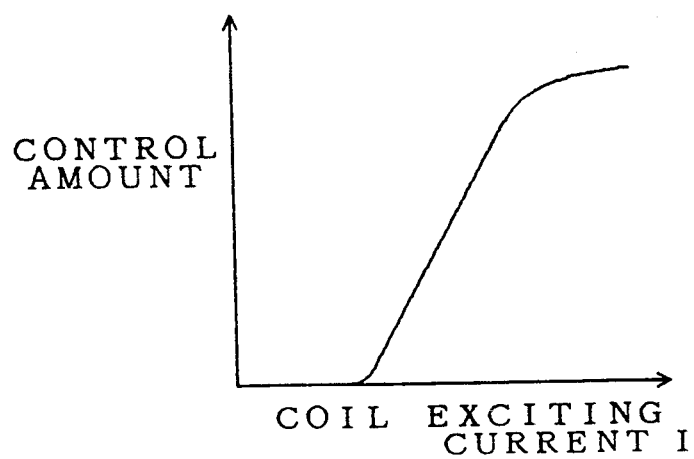
FIG. 8 is a characteristics view showing the relationship between the exciting current of an electromagnetic device and a control amount.

FIG. 2 is a configurational view illustrating more concretely an embodiment in which each of the control apparatus shown in FIGS. 1A and 1B is used to control an electromagnetic proportional valve. The numeral 11 indicates a controller comprising a microprocessor or the like. When a control target value instructed by the operation lever or the like is input to the controller 11, the controller 11 outputs a digital signal (hereinafter simply referred to as duty factor D) illustrating a duty proportional to the control target value. The numeral 14 indicates an electromagnetic proportional valve 14 which controls oil pressure and oil flow rate in response to the operation of the operation lever. The numeral 15 indicates an input and output section 15 which includes a digital output section 15a and an AD conversion section 15b. The digital output section 15a has within it a counter for counting a built-in clock signal and a register for storing a count value for determining one cycle t of a pulse width modulation driving signal (hereinafter called a PWM pulse signal) shown in FIG. 3(b). The count value of the counter increases in response to the successive input of the built-in clock signal, as a line C1 shown in FIG. 3(a) and is reset when it becomes equal to a value C3 stored in a register. The digital output section 15a also has a register for holding the duty factor D supplied from the controller 11. If the duty factor D is given as a dotted line C2 shown in FIG. 3(a), the digital output section 15 outputs a low-level PWM pulse signal as shown in FIG. 3(b) for a period until the count value of a counter exceeds the value of D. In an initialized state immediately after a power supply is turned on and with the operation lever set at neutral, D=0 and no low-level PWM pulse signal is output.

Shown also in FIG. 2 are a driving transistor 16, which is switched on by a PWM pulse signal at a low level for supplying a coil exciting current to the coil of the electromagnetic proportional valve 14, a flywheel diode 17, a resistor 18 connected in series with the electromagnetic proportional valve 14 for converting a current flowing through the coil to a voltage, and an integration circuit 19 for integrating a voltage generated across the resistor 18.

When duty factor D is output from the controller 11, the digital output section 15a inputs a low-level pulse to the driving transistor 16 for a period corresponding to this duty factor D. The digital output section 15a also outputs an interruption request to the controller 11 at a start timing of each cycle of a PWM pulse signal. In addition, the digital output section 15a outputs a high-level reset signal for resetting the integration value of the integration circuit 19 for every other cycle of the PWM pulse signal.

On the other hand, the controller 11 reads in the integration value of the integration circuit 19 via the AD converter 15b in response to the interruption request and calculates the duty factor to be output next. The integration circuit 19 converts the exciting current flowing through the coil to a voltage by the resistor 18 and integrates it for a period when a reset signal from the digital output section 15a is at low level.

The operation of the configuration described above will be explained with reference to the time chart of FIG. 3 and the flowchart of FIGS. 4A and 4B.

When the power supply of the apparatus is turned on, an initialization process shown in FIG. 4A is executed by the controller 11. That is, the controller 11 causes the digital output section 15a to output a high-level reset signal, so that the integration value of the integration circuit 19 is initialized (reset) (step S1). A duty factor conversion coefficient K, which is a coefficient for the calculating of the duty factor, is initialized to a standard value $K_0$. A control target value I given form the operation lever and a duty factor value D are initialized to 0 (step S2), respectively. After this, the system waits for the interruption request input from the digital output section 15a (step S3). In this initialized state, since the duty factor D is 0 and a low-level PWM pulse signal is not output, an exciting current does not flow through the coil and the electromagnetic proportional valve 14 is not driven. In addition, the standard $K_0$ is a value in a state in which a coil resistance and a power supply voltage are set in a certain standard state.

In this initialized state, when the interruption request is input to the controller 11 every cycle t, the controller 11 performs the interruption process shown in FIG. 4B.

In this interruption process, it is judged whether a reset signal output from the digital output section 15a is at a high or low level. When it is at a high level, the reset signal is made at a low level in order to integrate at the cycle of this time (steps S11 and S20). When a reset signal is at a low level, integration has been performed at the previous cycle. Therefore, an integration value $I_i$ of the integration circuit 19 is read in via the AD converter (step S12), then the reset signal is changed to a high level so that the integration value $I_i$ of the integration circuit 19 is reset (step S13).

In a determination of the duty factor conversion coefficient K, since D=0 or $I_i$=0 in the initialized state or in a state in which the driving of the electromagnetic proportional valve 14 is stopped, K is set at $K_0$ (steps S14, S15, and S19). This duty factor conversion coefficient K is multiplied by the control target value I and duty factor D of the next cycle is calculated (step S17). When the operation lever is not operated, D is 0 because the control target value I is 0, and the exciting current of the electromagnetic proportional valve 14 does not flow.

After the above calculation is completed, the value of the control target value I given by the operation of the operation lever is read in (step S18), and the system waits for the next interruption request to be input.

If a control target value, $I=I(t_1)$, is given by the operation lever at step S18, which is carried out in the first interruption process after initialization, then, in the second interruption process, if the reset signal of the last cycle is at a high level, the calculation $D=K_0 \cdot I(t_1)$ is made during the process of step S17 after the execution of step S20, so that the duty factor D of the third cycle is determined. As a result, the electromagnetic proportional valve 14 is driven during a period in which a PWM pulse signal is at a low level corresponding to the duty factor D at this time. If a control target value, I=I ($t_2$), is read in at the last step S18 of the second interruption process, then, the processes of steps S11 to S16 are executed in the third interruption process. The calculation $K = D / I_i$ is performed at step S16 and the duty conversion coefficient K is determined from the ratio between the integration value $I_i$ of the exciting current which flowed in the third cycle and the duty factor D. At the next step S17, this duty factor conversion coefficient K is multiplied by the next control target value I ($t_2$), so that the duty factor D of the fourth cycle is determined.

Such control causes the exciting current whose wave-form is shown in FIG. 3(d) to flow through the coil of the electromagnetic proportional valve 14. The integration circuit 19 integrates the exciting current in synchronization with the PWM pulse signal and outputs integration value $I_i$ as shown in FIG. 3(e).

In this way, the ratio (duty factor conversion coefficient) ($I_i$) of an actual value ($I_i$) of an exciting current to an arbitrary duty D is determined, and the next duty of a PWM pulse signal to be output is calculated according to the ratio. Therefore, even if variations in the temperature of the coil of the electromagnetic proportional valve 14 occur, the exciting current can be brought close to the control target value with high accuracy. Since the actual value ($I_i$) of the exciting current is fed back for every other cycle of the pulse width modulation driving, the duty factor conversion coefficient K is modified while very accurately following the ever-changing variation of the exciting current. As a result, any error as regards the correction amount of the duty is extremely small.

When the control apparatus in the embodiment shown in FIG. 2 is compared with the control apparatuses shown in FIGS. 1A and 1B, it is seen that the controller 11 corresponds to each of the duty factor calculation circuit 101, the duty factor calculation section 101A, and the correction coefficient calculation section 101B; the digital output section 15a corresponds to the pulse signal formation circuit 102; the driving transistor 16 corresponds to the exciting current formation circuit 103; and the electromagnetic proportional valve 14 corresponds to the electromagnetic apparatus 104.

In the above-mentioned embodiment, the voltage across the resistor 18 developed by the exciting current is integrated for every other cycle of the PWM pulse signal. However, if a duty conversion coefficient K with a required accuracy is obtained, it may be integrated for every two cycles or more.

Figure 1C:
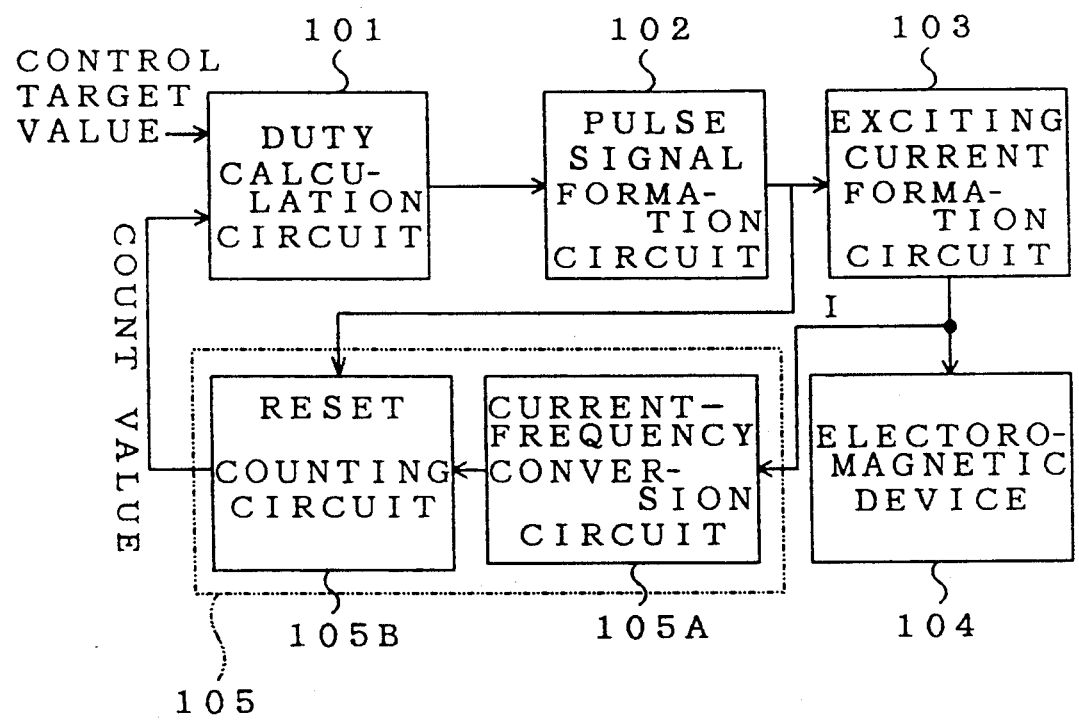

FIG. 1C shows still another modification in which the integration circuit 105 of FIG. 1A is formed as a digital type. That is, the control apparatus of FIG. 1C has a digital integration circuit 105 comprised of a current-frequency conversion circuit 105A for generating a pulse train with a frequency corresponding to the exciting current of the coil and a counting circuit 105B, which is reset in synchronization with a pulse signal, for counting the pulse train. The duty factor calculation circuit 101 calculates a duty from a control target value given and the count value of the counting circuit 105B.

In addition, in this control apparatus shown in FIG. 1C, it may be arranged in the same way as the control apparatus shown in FIG. 1B that the duty factor calculation circuit 101 is comprised of the duty factor calculation section 101A and the correction coefficient calculation section 101B. The correction coefficient may be calculated by the correction coefficient calculation section 101B from the count value and the duty factor which has been determined previously, and a new duty is determined from this correction coefficient and a control target value.

Figure 5:
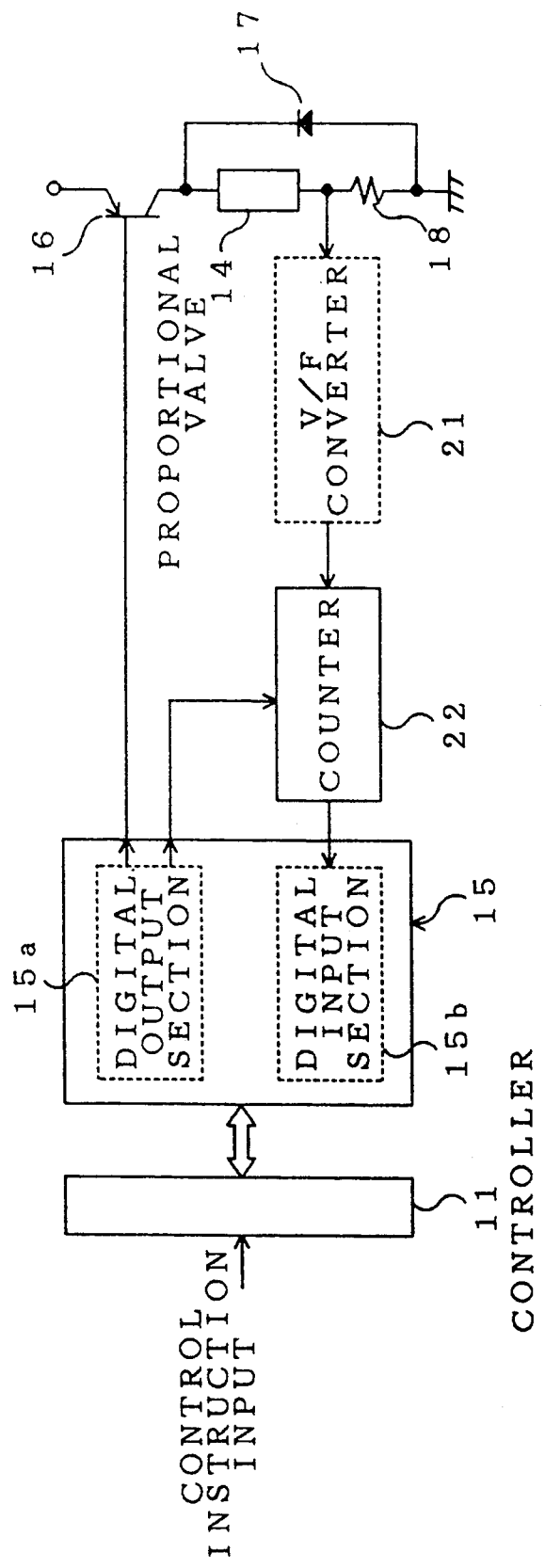

FIG. 5 is a configurational view more concretely illustrating another embodiment in which the control apparatus shown in FIG. 1C is used in the control of an electromagnetic proportional valve. In this embodiment, the integration circuit of the embodiment shown in FIG. 2 is formed from a digital circuit. In FIG. 5, the same parts as those of FIG. 2 are given the same reference numeral. The following explanation centers on those aspects of the embodiment shown in FIG. 5 which differ from those shown in FIG. 2.

Shown in the figure are a voltage-frequency converter 21 for generating a pulse train with a frequency proportional to a voltage generated across the resistor 18, and a counter 22 for counting the number of pulses of the pulse train and for outputting the count value, which is an integration value.

When a duty factor D is output from the controller 11, the digital output section 15a inputs a low-level pulse to the driving transistor 16 for a period corresponding to this duty factor D. The digital output section 15a outputs an interruption request to the controller 11 at the starting time of each cycle of the PWM pulse signal.

On the other hand, the controller 11 reads in the count value of the counter 22 via the digital input section 15b in response to the above-mentioned interruption request and then outputs a reset signal for resetting the counter 22 via the digital output section 15a. Then, the controller 11 calculates the duty factor to be output next on the basis of the count value obtained and control instruction input.

The operation of the above-mentioned configuration will be explained with reference to the time chart of FIG. 3 and the flowcharts of FIGS. 4A and 6.

When the power supply of an apparatus is turned on, the initialization process of FIG. 4A is executed. That is, the controller 11 outputs a pulse-like reset signal to the digital output section 15a. The reset signal is a pulse-like signal having a pulse width sufficiently short with respect to the cycle of the PWM pulse signal, and the counter 22 is reset (cleared to 0) during the leading edge of the reset signal (step S1). In step S2, the initialization is made so that a duty factor conversion coefficient K is set to a standard value $K_0$, control target value I is set to 0, and duty factor D is set to 0 in the same way as described above (step S2). Then, the system waits for the interruption request to be input from the digital output section 15a (step S3).

Figure 6:
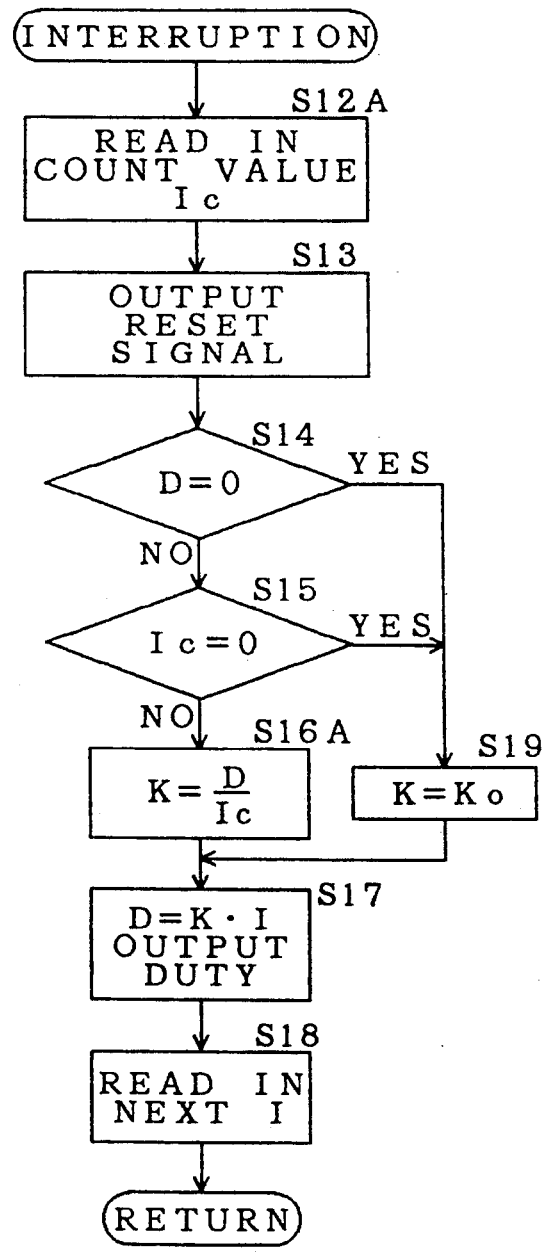

When the interruption request is input to the controller 11 for every cycle t in this initialized state, the controller 11 executes the interruption process shown in FIG. 6. During this interruption process, a count value $I_c$ of the counter 22 is read in via the digital input section 15b in step S12A and then a reset signal is output to reset the counter 22 (step S13).

After passing through the same steps S14 to S16, and S19 as described above, the duty factor is calculated in step S17. In this embodiment, the duty factor D is determined as the product of the control target value I and the duty factor conversion coefficient K in the same way as the above. Therefore, as a duty factor conversion coefficient K, a coefficient indicating the degree of the excess or deficiency of the value of a current which actually flowed from a current value given is selected. In this embodiment, the duty factor D is used as a value representing a current value given, and the integration count value $I_c$ of the counter 22 is used as a value representing the value of the current which actually flowed. The duty factor conversion coefficient is calculated from $K = D/I_c$ at step S16A. In step S17, a new duty factor D is calculated from $D = K \cdot I$ and output to the digital output section 15a (step S7). Then, a control target value I is read out in preparation for the next cycle (step S18), and the system returns from the interruption process.

Such control causes a wave-form exciting current as shown in FIG. 3(d) to flow through the coil of the electromagnetic proportional valve 14 in the same way as the previous embodiment. The exciting current is converted to a voltage by the resistor 18, and further converted to a high-frequency pulse train when the current value is high and to a low-frequency pulse train when the current value is low by the voltage-frequency converter 21. Accordingly, the count value of the counter 22 indicates the integration value of the current from the time when the counter is reset by a reset signal. The average value of the exciting current is $I_c/t$, but one cycle t of the PWM pulse signal is a fixed value, so the average value and the $I_c$ have a proportional relationship to each other. Taking into consideration that the proportional constant should be included in the duty factor conversion coefficient, the integration count value $I_c$ can be handled as the average value of the exciting current.

As described above, in this embodiment, the ratio (duty factor conversion coefficient) of the actual value ($I_c$) of the exciting current to an arbitrary duty factor D is determined and the next duty of the PWM pulse signal to be output is calculated according to the ratio. Therefore, if variations in the temperature of the coil of the electromagnetic proportional valve 14 occur, the exciting current can be brought close to a control target value with high accuracy. Since the actual value ($I_c$) of the exciting current is fed back for every other cycle of the pulse width modulation driving, the duty factor conversion coefficient K is modified while very accurately following the ever-changing variation of the exciting current. As a result, any error as regards the correction amount of the duty factor is extremely small.

Still another embodiment of the present invention will be explained with reference to FIGS. 7A and 7B. The hardware configuration of this embodiment is the same as that shown in FIG. 5.

Figure 7A:
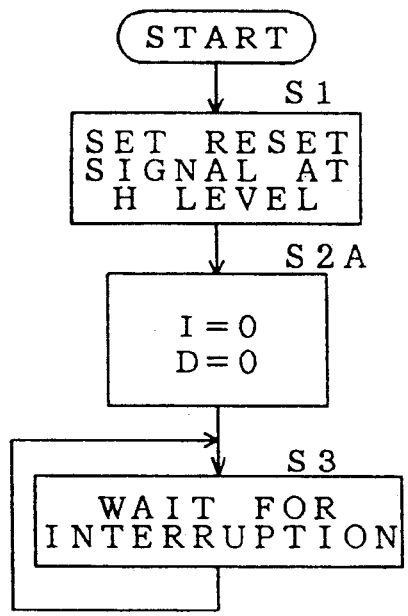

When the power supply is turned on, the interruption process of FIG. 7A is executed by the controller 11. The controller 11 sends a reset signal to the counter 22 via the digital output section 15a to set the count value to 0 (step S1). The control target value I given by the operation lever and the duty factor D are both initialized to 0 (step S2A). Then, the system waits for an interruption request to be input from the input and output control section 15 (step S3).

Figure 7B:
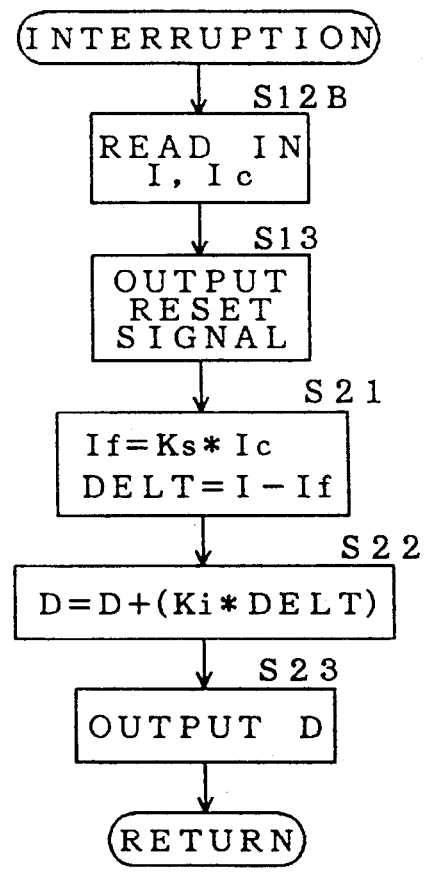
Figure 9:
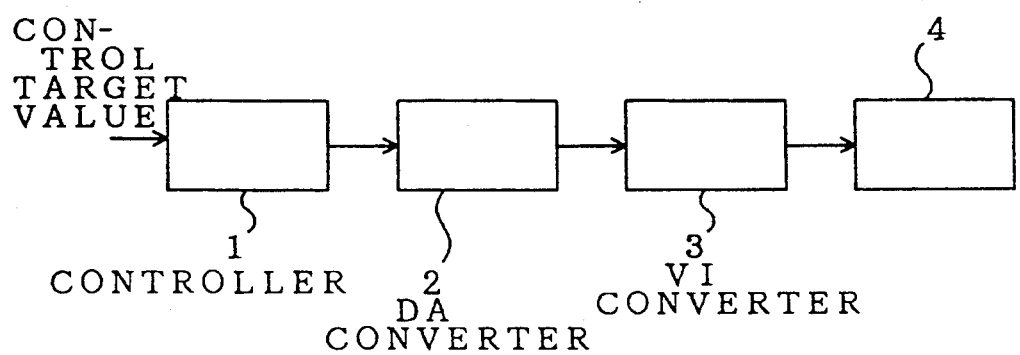
FIG. 9 is a configurational view illustrating one example of a conventional apparatus.
Figure 10:
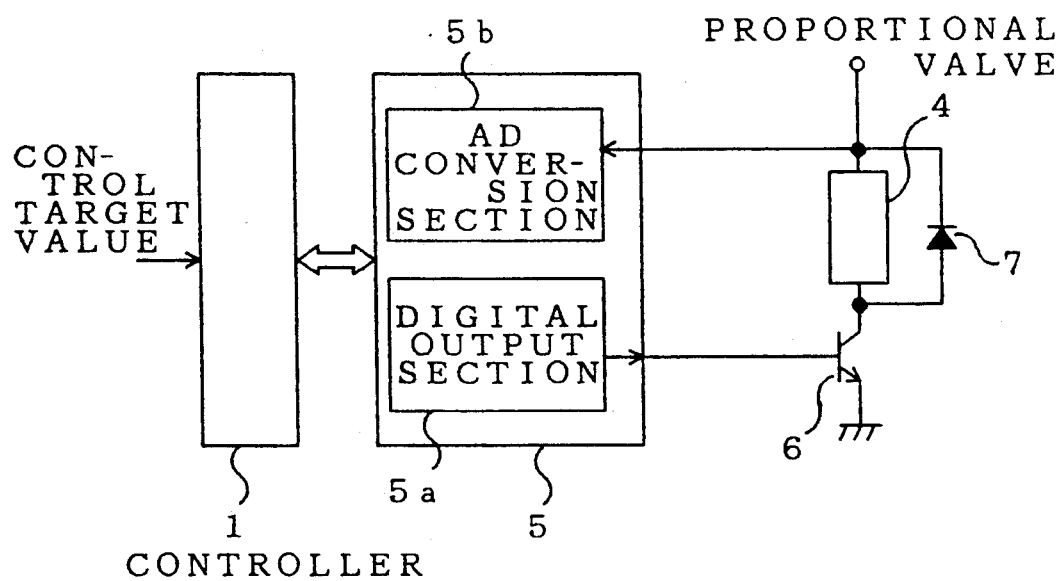
FIG. 10 is a configurational view illustrating another example of a conventional apparatus.

When an interruption request is input to the controller 11 for every cycle t in this initialized state, the controller 11 executes the interruption process shown in FIG. 7B.

In this interruption process, the count value $I_c$ of the counter 22 and the control target value I are read in via the input and output control section 15 (step S12B). A reset signal is sent to the counter 22 to set the count value to 0 (step S13). The count value I is multiplied by the count $K_s$ so as to be converted to a current $I_f$ a dimension of which is equal to the control target value I. Then, the difference DELT (deviation of an actually flowing current from a target current value) with respect to the control target value I is determined (step S21). The duty factor D is determined by adding (subtracting in the case of a negative DELT) the product of the deviation DELT determined at this time and the gain $K_i$ to the duty factor D output at the previous cycle (step S22). The $K_i$ in the above is a control gain. When the $K_i$ is greater, a quick response is obtained, but it tends to become unstable. When the $K_i$ is smaller, it is stable, but it has a tendency of lacking a quick response. The duty factor D previously calculated is output (step S23). This is performed by rewriting a register in which (C2) shown in FIG. 3(a) is stored.

In the embodiment of the present invention shown in FIGS. 7A and 7B, the duty factor D is calculated by feeding back the deviation DELT of an actual current value $I_f$ from the control target value I provided by the operation lever, and therefore the same operational advantages as previously explained regarding the embodiments of FIGS. 2 and 5 can be obtained.

In the embodiments of FIGS. 2 and 5 explained hereinabove, the overall time schedule management and the pulse width modulation calculation are shared by the controller 11 and the digital output section 15a respectively. The digital output section 15a, in parallel with the process of the controller 11, forms a pulse signal train having a pulse width of a predetermined duty on the basis of a digital signal representing the duty factor D which is input from the controller 11.

As described above, the aim of parallel processing is high-speed response. For example, in a case involving the use of a so-called trace control apparatus which mounts a work attachment at the front end of the arm of a hydraulic articulated working machine mentioned above and which moves the work attachment along a predefined path, such parallel processing is indispensable because a trace control apparatus requires high-speed response. In contrast, in a case where an electromagnetic valve may be controlled very slowly, e.g., every one second, as in a chemical plant, one CPU may be used to execute the overall schedule management and the pulse width modulation calculation without performing parallel processing.

INDUSTRIAL APPLICABILITY

In the above, the use of the present invention in an electromagnetic proportional valve was explained. However, the present invention may be used in other electromagnetic device having proportional solenoid.

What is claimed is:

1. A control apparatus for an electromagnetic device having proportional solenoid, said apparatus comprising:
   duty factor calculation means for calculating a duty factor on the basis of a control target value;
   pulse signal formation means for forming a pulse signal with the calculated duty factor; and
   exciting current formation means for forming an exciting current for stimulating a coil of an electromagnetic apparatus in response to the formed pulse signal;

wherein said control apparatus further comprises integration means for integrating the exciting current of said coil in synchronization with said pulse signal and wherein said duty factor calculation means calculates said duty factor from said control target value and an integration valve output from said integration means.

2. A control apparatus as claimed in claim 1, wherein said duty factor calculation means comprises:

correction coefficient calculation means for calculating a correction coefficient from the ratio between said integration value from said integration means and the duty factor which has been used to form said integrated exciting current; and wherein said duty factor calculation means calculates said duty factor from the control target value and a correction coefficient.

3. A control apparatus as claimed in claim 2, wherein said integration means includes an analog integration circuit.

4. A control apparatus as claimed in claim 2, wherein said integration means comprises:

current-frequency conversion means for generating a pulse train with a frequency corresponding to the exciting current of said coil; and counting means for counting the pulse train and for providing said pulse train count as said integration value;

wherein said counting means is reset in synchronization with said pulse signal.

5. A control apparatus as claimed in claim 2, wherein said duty factor calculation means and the pulse formation means operate in parallel.

6. A control apparatus as claimed in claim 1, wherein said duty factor calculation means calculates said duty factor according to the deviation between the integration value of the integration means and said control target value.

7. A control apparatus as claimed in claim 6, wherein said integration means includes an analog integration circuit.

8. A control apparatus as claimed in claim 6, wherein said integration means comprises:

current-frequency conversion means for generating a pulse train with a frequency corresponding to the exciting current of said coil; and counting means for counting the pulse train and for providing said pulse train count as said integration value;

wherein said counting means is reset in synchronization with said pulse signal.

9. A control apparatus as claimed in claim 6, wherein said duty factor calculation means and the pulse formation means operate in parallel.

10. A control apparatus as claimed in claim 1, wherein said integration means includes an analog integration circuit.

11. A control apparatus as claimed in claim 1, wherein said integration means comprises:

current-frequency conversion means for generating a pulse train with a frequency corresponding to the exciting current of said coil; and counting means for counting the pulse train and for providing said pulse train count as said integration value;

wherein said counting means is reset in synchronization with said pulse signal.

12. A control apparatus as claimed in claim 1, wherein said duty factor calculation means and pulse formation means operate in parallel.

* * * * *